Oct. 17, 1944.   S. RUBEN   2,360,367
ELECTROSTATIC CONDENSER AND DIELECTRIC THEREFOR
Filed Jan. 9, 1940
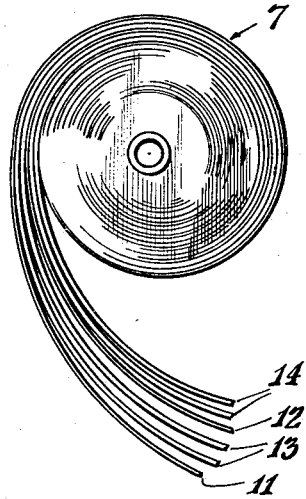
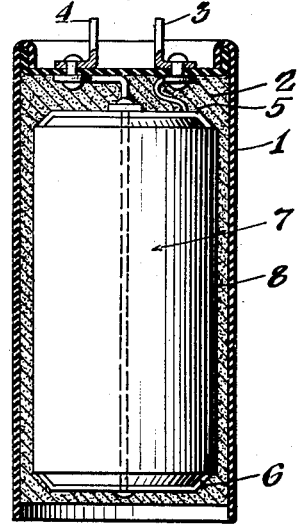
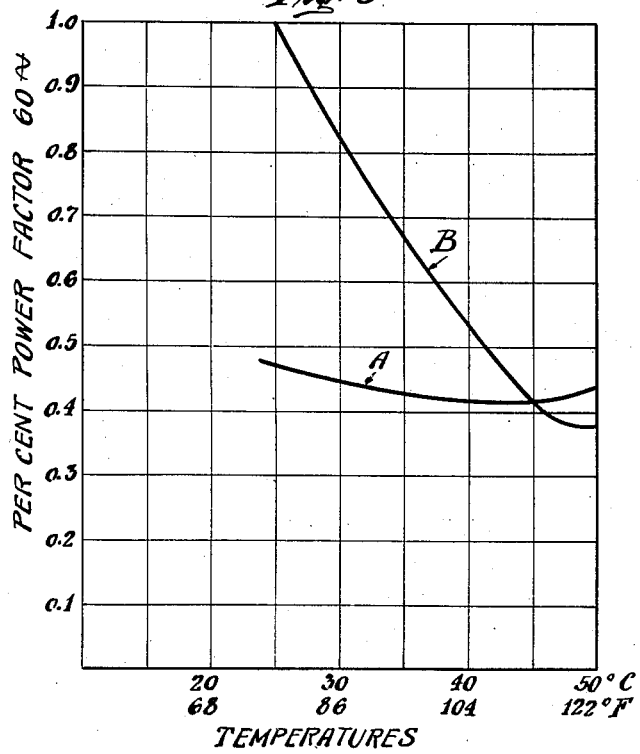
INVENTOR
Samuel Ruben
BY
ATTORNEY Patented Oct. 17, 1944

2,360,367

UNITED STATES PATENT OFFICE 2,360,367

ELECTROSTATIC CONDENSER AND DIELECTRIC THEREFOR

Samuel Ruben, New Rochelle, N. Y.

Application January 9, 1940, Serial No. 313,028

4 Claims. (Cl. 117—161)

This invention relates to electrostatic condensers and dielectrics therefor.

An object of the invention is to provide an improved electrostatic condenser and improved dielectric materials for use therein.

The general object of the invention is to provide an electrostatic condenser having a solid dielectric, having a reducing power factor with increase in temperature in the normal operating range of the condenser.

A further object is the provision of a condenser of this type which is of low inflammability.

Still another object is the provision of a solid dielectric condenser of the wound foil spacer type which possesses high voltage breakdown and high resistivity.

Other objects will be apparent as the disclosure proceeds and from the drawing in which:

Fig. 1 is an end view of a condenser section partly assembled;

Fig. 2 is a view partly in section of a completed condenser; and

Fig. 3 is a graph giving temperature-power factor characteristics of condensers made according to this invention.

The present invention comprehends an electrostatic condenser having an improved dielectric material comprising polymerized (and in some cases hydrogenated) cyclopentadiene. The polymerized cyclopentadiene is a resin formed by the polymerization of the liquid hydrocarbon cyclopentadiene having the empirical formula $C_5H_6$. One practical suitable polymer of cyclopentadiene is the tetramer $C_{20}H_{24}$. It is important that the cyclopentadiene resin be as pure as possible and preferably free from coumarone and indene resins. It is also contemplated that the cyclopentadiene polymer resin may be combined with a plasticizing dielectric in liquid or other form such as, for example, mineral oil, castor oil, one of the dimers of di-hydronaphthalene or cyclopentadiene, chlorinated di-phenyl, chlorinated naphthalene, ethyl chlor-benzene, etc.

While suitable liquid dielectrics can be used as plasticizers, I have found that a solid dielectric such as chlorinated naphthalene is also satisfactory. If up to approximately 45% of solid chlorinated naphthalene be heated and dissolved into liquified polymerized cyclopentadiene, a clear translucent brown resin is obtained which is plastic at room temperature. If the percentage of chlorinated naphthaline is greater than 45%, an emulsion occurs of an opaque (when cool) material containing free chlorinated naphthalene crystals. I prefer the chlorinated aromatic dielectric compounds as plasticizers because of their relatively high dielectric constant and their ability to reduce the inflammability of the dielectric.

The addition of chlorinated aromatic compounds as plasticizers affords a good means of raising the dielectric constant of the cyclopentadiene polymer; however, this may also be accomplished by directly chlorinating the cyclopentadiene resin so as to form the di-chlor cyclopentadiene or polymer thereof. Thus the dielectric constant can be raised from 2.7 to about 4.5, depending upon the degree of chlorination. These chlorinated derivatives of di-cyclopentadiene can themselves be plasticized, if desired, with various other chlorinated aromatic dielectric compounds, with other miscible dielectric liquids, or with a chlorinated lower cyclopentadiene polymer. If a liquid dielectric is desired, an appropriate mixture of two different melting point chlorinated cyclopentadiene derivatives is utilized, according to the desired crystallization temperature.

When cyclopentadiene resin is heated to its melting point and combined with another dielectric having the property of plasticizing the resin, such as ethyl chlorobenzene, for example, a thermoplastic and thermo-adhesive dielectric material is produced, which, when impregnated into the spacer of a condenser will give satisfactory operation and good power factor characteristics on continuous operation with alternating current, even at elevated temperatures. I have found that the higher the polymer used the lower the power factor loss will be. The tetramer has very good characteristics.

To obtain the best results the polymerized cyclopentadiene should be hydrogenated whereby its chemical stability and its resistance to oxidation is increased.

A mixture of about 60% cyclopentadiene polymer resin with about 40% ethyl chlorobenzene (preferably a mixture of penta and tetra containing a preponderance of the former), is suitable for many applications. This composition will remain solid at all operating temperatures up to about 70° C., and will permit effective impregnation of prewound condenser units at a temperature of 140° C. where porous spacers such as double layers of kraft or linen paper are used.

Ethyl chlorobenzene is considered the preferred plasticizer but other dielectric liquids may replace it in whole or in part, such as the dimer of di-hydronaphthalene or the dimer of cyclopentadiene, each of which materials is itself an excellent condenser dielectric. The percentage of plasticizer used may be varied to obtain the desirable properties in the finished dielectric for the type of operation for which it is intended. Thus the maximum expected operating temperature of the condenser may be taken into consideration and a composition selected which will remain solid up to that temperature if desired. Also the temperature at which the condenser must be impregnated will depend upon the composition used.

The condenser can be formed as illustrated in Figure 1 by rolling together a pair of thin metal foils 11 and 12, such as aluminum foil, interleaved with double layer sheet spacers 13 and 14 respectively. The sheet spacers may, for example, be kraft paper or they may be processed regenerated cellulose film. After the condenser roll 7 is formed by winding the foils and spacers together in this manner the condenser roll or section 7 may be impregnated with the molten dielectric composition by immersion in the molten mixture at a temperature of about 140° C. Provision should be made in the impregnating chamber to allow refluxing back on any volatilized liquid under impregnating conditions of low pressure and high temperature so that a uniform dielectric composition will be maintained. A vacuum should preferably be applied to obtain as low a pressure as is possible to permit thorough impregnation.

Figure 2 of the drawing illustrates a completed condenser unit comprising impregnated condenser section 7 enclosed in a suitable fibre tube 1 and embedded in a moisture repellent dielectric material 2 which may, if desired, be my preferred dielectric composition described herein. The foils 11 and 12 of the condenser section may preferably be wound in offset relation so that foil 11 projects from one end of the roll and foil 12 from the other. Contact is then made with the two foils by contact members 5 and 6 respectively. Contact member 5 is connected by a suitable conductor to a soldering lug or terminal 3 attached to the closure disc closing one end of fibre tube 1. Contact 6 is connected to a similar soldering lug 4 by a conductor which passes through the center of the roll and through an insulating bushing in the center of contact 5. This conductor also serves to draw contacts 5 and 6 against the ends of the roll.

The two curves in Figure 3 represent the power factor v. temperature characteristics of wound foil condensers made with kraft paper separators impregnated with dielectrics of this invention. Curve A shows the characteristics of such a condenser having a dielectric consisting of 60% cyclopentadiene polymer resin and 40% of a mixture of ethyl penta and tetra chlorobenzene. Curve B shows the characteristics of such a condenser having a dielectric of 60% cyclopentadiene polymer resin and 40% solid chlorinated naphthalene. In both cases, the dielectric is a viscous solid material, even though in one case a liquid was used as a plasticizer and in the other a solid.

What is claimed is:

1. A dielectric element for an electric condenser comprising a condenser spacer impregnated with a dielectric of cyclopentadiene polymer dielectric resin plasticized with a chlorinated aromatic hydrocarbon dielectric plasticizer selected from the group consisting of chlorinated di-phenyl, chlorinated naphthalene, chlorinated cyclopentadiene polymer and a mixture of ethyl tetrachlorobenzene and ethyl pentachlorobenzene.

2. A dielectric element for an electric condenser comprising a condenser spacer impregnated with cyclopentadiene polymer dielectric resin plasticized with a mixture of ethyl tetrachlorobenzene and ethyl pentachlorobenzene.

3. A dielectric element for an electric condenser comprising a condenser spacer impregnated with cyclopentadiene polymer dielectric resin having the empirical formula $C_{20}H_{24}$ plasticized with a mixture of ethyl tetrachlorobenzene and ethyl pentachlorobenzene.

4. A dielectric element for an electric condenser comprising a condenser spacer impregnated with about 60% cyclopentadiene polymer dielectric resin and about 40% of a mixture of ethyl tetrachlorobenzene and ethyl pentachlorobenzene.

SAMUEL RUBEN.